Patented May 19, 1942

2,283,718

UNITED STATES PATENT OFFICE 2,283,718

CHEMOTHERAPEUTICAL SUBSTANCES

Ernst Bergmann, Felix Bergmann, and Leon Haskelberg, Rehoboth, Palestine

No Drawing. Application August 17, 1939, Serial No. 290,670

4 Claims. (Cl. 260—148)

This invention relates to chemotherapeuticals containing arsenic.

It is known that a number of substances containing organically bound arsenic, and particularly atoxyl (sodium p-aminophenyl arsonate) and its derivatives, homologues and related substances, have outstanding chemotherapeutical properties. On the other hand, their toxicity is in most cases high, or in other words, their chemotherapeutical index is low.

We have now found that the toxicity of such substances can be greatly lowered if they are coupled in azo-bond with 1-naphthylamine-5-sulfonic acid, or a derivative thereof.

These coupling products are remarkable by an especially high chemotherapeutical index.

The properties of the coupling product can still be improved by (a) Closing the sulfonic acid group, for example by converting it into a sulfonamide group, or
(b) Condensing the free amino group with a halogeno acetamide, or
(c) Coupling the free amino groups of two molecules of the azo compound with one molecule of phosgene whereby high molecular urea derivatives are obtained.

Arsenic-containing chemotherapeuticals according to this invention and processes for their preparation are described in the following examples to which, however, the invention is not limited.

EXAMPLE 1

1'-amino-naphthalene-(4'-azo-1)-benzene-4-arsonic-5'-sulfonic acid 23.8 grs. of sodium p-aminophenyl arsonate (atoxyl) are dissolved in 860 cc. of water, and diazotised at 0° C. by the addition of 150 cc. of n-hydrochloric acid and 750 cc. of n/10 sodium nitrite aqueous solutions. To the reaction mixture, a suspension of 22.3 grs. of 1-amino-naphthalene-5-sulfonic acid in 300 cc. of water is added, and the whole is allowed to stand for six hours. The condensation product thus obtained is a crystalline dyestuff which is washed with hot water and, for purification, precipitated from its hot solution in sodium carbonate by the addition of dilute acetic acid. The substance dissolves in concentrated sulfuric acid with crimson-red colour; it forms dark-brown needles. The yield is 72%, the composition $C_{16}H_{14}O_6N_3AsS$.

For the preparation of the sodium salt, the acid is dissolved in an excess of aqueous sodium carbonate solution, and one third its volume of alcohol is added. The sodium salt is purified by precipitating it from its brown-red aqueous solution by means of alcohol. It forms brown leaflets with metallic lustre which on exposure to the air turn into a cherry-red powder.

The curative dosis against *Trypanosoma gambiense* is 0.2 gr. per kg.; the minimum lethal dosis 2.2 grs. per kg.

EXAMPLE 2

1'-amino-naphthalene-(4'-azo-1)-benzene-4-arsonic-5'-sulfonic acid-N-acetamide 2.5 grs. of the sodium salt of 1'-amino-naphthalene -(4'-azo-1)- benzene -4- arsonic-5'-sulfonic acid, as obtained according to Example 1, are heated in 30 cc. of benzene with 1 gr. of bromo-acetamide for 6 hours on a boiling water bath. The dark-red solution so obtained is filtered and precipitated by the addition of glacial acetic acid. After recrystallization from boiling water, the substance forms dark-violet crystals of composition $C_{18}H_{17}O_7N_4AsS$.

The curative dosis against *Trypanosoma gambiense* is 0.3 gr. per kg., the minimum lethal dosis 0.7 gr. per kag.

EXAMPLE 3

Urea derivative of 1'amino-naphthalene-(4'-azo-1)-benzene-4-arsonic-5'-sulfonic acid 6 grs. of the acid obtained according to Example 1, and 1.4 grs. of sodium carbonate are dissolved in 250 cc. of water. The dark-red solution is cooled to 0° and treated for 10 minutes with a stream of gaseous phosgene. The precipitate is dissolved together with 1.4 grs. of sodium carbonate in 100 cc. of water, filtered, and the hot solution precipitated with 10 cc. of glacial acetic acid. On cooling, the urea derivative formed precipitates as an amorphous powder which on heating under the solution turns into a brown-violet microcrystalline substance having the composition $C_{33}H_{26}O_{13}N_6As_2S_2$.

The curative dosis is 0.2 gr. per kg., while the minimum lethal dosis is as high as 4.5 grs. per kg.

We claim:

1. Chemotherapeuticals in which p-aminophenyl-arsonic acid is coupled by an azo bond to a substance selected from the group consisting of 1-naphthylamine-5-sulfonic acid, 1-naphthylamine-5-sulfonic acid-N-acetamide, 1-naphthylamine-5-sulfonamide and naphthalene-5-sulfonic acid substituted in the 1-position by an amido group of urea.

2. A chemotherapeutical consisting of two naphthalene-(4'-azo-1) benzene-4-arsonic-5'-sulfonic acid residues combined to a urea residue the two amido groups of which form respectively substitutes of the two naphthalene nuclei in the 1'-positions thereof.

3. A process for preparing arsenic-containing chemotherapeuticals, comprising diazotizing p-amino-phenyl-arsonic acid, coupling the diazotized product with a substance selected from the group consisting of 1-naphthylamine-5-sulfonic acid and 1-naphthylamine-5-sulfonamide, and isolating the coupling product.

4. A process for preparing arsenic-containing chemotherapeuticals, comprising diazotizing p-amino-phenyl-arsonic acid, coupling the diazotized product with 1-naphthylamine-5-sulfonic acid, and causing the coupling product to react with phosgene.

ERNST BERGMANN.
FELIX BERGMANN.
LEON HASKELBERG.